(12) United States Patent
Boos

(10) Patent No.: US 7,684,763 B2
(45) Date of Patent: Mar. 23, 2010

(54) TRANSCEIVER CIRCUIT AND METHOD FOR PROVIDING LOCAL OSCILLATOR SIGNALS IN A TRANSCEIVER CIRCUIT

(75) Inventor: Zdravko Boos, München (DE)

(73) Assignee: Infineon Technologies AG, Munich (DE)

( * ) Notice: Subject to any disclaimer, the term of this patent is extended or adjusted under 35 U.S.C. 154(b) by 866 days.

(21) Appl. No.: 11/101,946

(22) Filed: Apr. 8, 2005

(65) Prior Publication Data
US 2005/0239417 A1    Oct. 27, 2005

(30) Foreign Application Priority Data
Apr. 8, 2004    (DE) .................. 10 2004 017 527

(51) Int. Cl.
*H04B 1/38*    (2006.01)
(52) U.S. Cl. .................. 455/73; 455/76; 455/78; 455/79; 455/80
(58) Field of Classification Search .......... 455/77, 455/78–86, 87, 88, 73, 76, 318, 255, 118, 455/323–325, 333–334, 127.4
See application file for complete search history.

(56) References Cited

U.S. PATENT DOCUMENTS

| | | | |
|---|---|---|---|
| 6,175,746 B1 * | 1/2001 | Nakayama et al. | 455/552.1 |
| 6,204,732 B1 * | 3/2001 | Rapoport et al. | 331/2 |
| 6,564,039 B1 * | 5/2003 | Meador et al. | 455/76 |
| 6,708,044 B1 | 3/2004 | Puknat et al. | |
| 6,731,712 B1 * | 5/2004 | Lindstrom et al. | 375/376 |
| 7,085,549 B2 * | 8/2006 | Peterson et al. | 455/323 |
| 2003/0157915 A1 * | 8/2003 | Atkinson et al. | 455/306 |
| 2004/0038652 A1 | 2/2004 | Khlat et al. | |
| 2004/0242175 A1 * | 12/2004 | Lin | 455/147 |

FOREIGN PATENT DOCUMENTS

DE    199 16 574 C1    1/2001
EP    1 102 413 A2    5/2001

* cited by examiner

*Primary Examiner*—Tuan A Pham
(74) *Attorney, Agent, or Firm*—Eschweiler & Associates, LLC

(57) ABSTRACT

A transceiver circuit includes a transmission path and also at least two reception paths, which in each case contain a frequency conversion device with a local oscillator input. A first, a second and a third oscillator circuit, and also a programmable frequency divider circuit are furthermore provided. The outputs of the oscillator circuits are connected to a respective input of the programmable frequency divider circuit. The frequency divider circuit contains three outputs connected in each case to a local oscillator input of the transmission path and the two transmission paths. According to one example of the invention, the frequency divider circuit is designed for frequency division of a signal present at an input and for outputting the frequency-divided signal to one of the three outputs. With the programmable frequency divider circuit, signals at the three inputs of the frequency divider circuit can thus be divided arbitrarily in terms of their frequency and be output at the outputs in a manner dependent on the desired operating mode of the transceiver circuit.

18 Claims, 3 Drawing Sheets

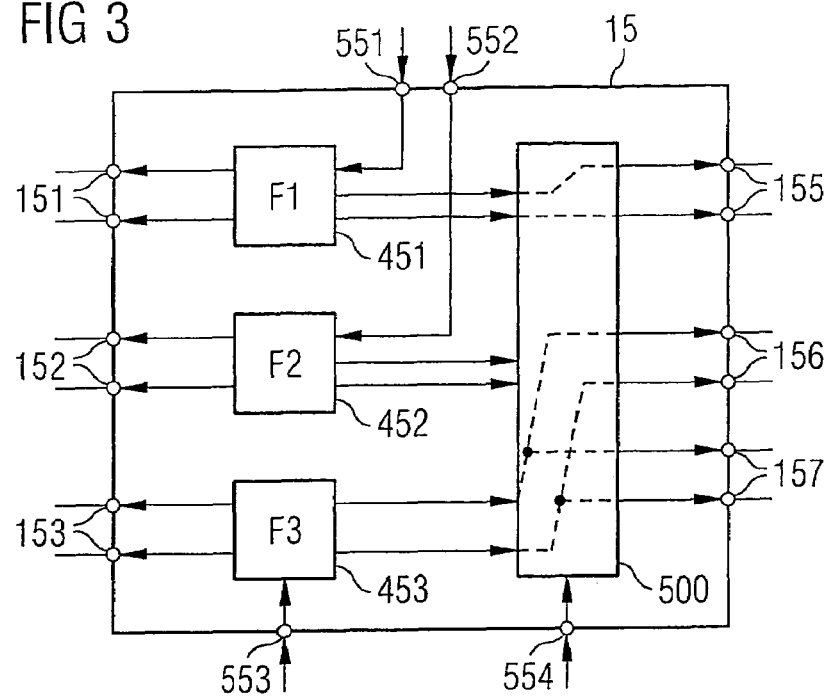
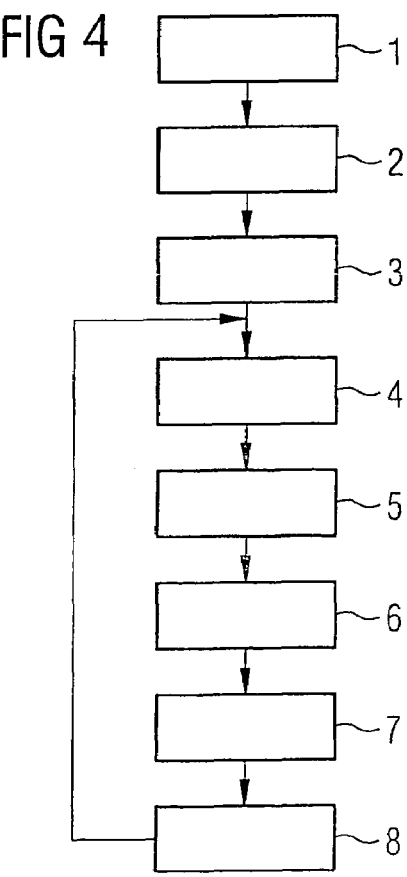

TRANSCEIVER CIRCUIT AND METHOD FOR PROVIDING LOCAL OSCILLATOR SIGNALS IN A TRANSCEIVER CIRCUIT

REFERENCE TO RELATED APPLICATIONS

This application claims the benefit of the priority date of German application DE 10 2004 017 527.6, filed on Apr. 8, 2004, the contents of which are herein incorporated by reference in its entirety.

FIELD OF THE INVENTION

The invention relates to a transceiver circuit. The invention furthermore relates to a method for providing local oscillator signals in a transceiver circuit.

BACKGROUND OF THE INVENTION

The requirements made of wire-free communication devices, for example mobile radio telephones, notebooks or so-called PDAs (Personal Digital Assistants), continue to rise with regard to their data transmission rate and flexibility. By way of example, the communication devices, in particular cordless or mobile telephones, and the transceiver circuits implemented therein have to be equipped for a wide variety of mobile radio standards. Examples of such mobile radio standards are GSM, UMTS/WCDMA, GPRS, GPS, Bluetooth and WLAN. The mobile radio standards cited here provide fixedly defined transmission and reception frequencies for the data transmission.

The range of said transmission and reception frequencies lies between 810 MHz in the case of the mobile radio standard GSM and 2.4 or even 5.4 GHz in the case of the mobile radio standards WLAN and 802.11. In addition, the transmission and reception frequencies used in part differ regionally. This has led in the past, for example, to the development of triple band devices which can be used both in Europe and in North America. In order to be able to satisfy the rising requirements, consideration has been given recently to the use of software-based radio transmission systems, so-called software defined radios. In these systems, a large part of the signal processing is effected by means of software and only the actual conversion to the transmission signal is performed by hardware. The advantage of these systems resides in the high flexibility with regard to the application of already existing mobile radio standards or mobile radio standards that are still being developed.

In addition to the different mobile radio standards, further different operating modes, for example simultaneous reception of a plurality of channels, monitoring of the signal quality, heterodyne reception or diversity mode (reception of the same signal on a plurality of antennas), are demanded for the transceiver. This results in an extensive and highly complex construction with different circuits for signal generation and signal processing. This causes costs and increases the space requirement.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to a transceiver circuit that enables a high flexibility with regard to different operating modes using simple means. The invention also includes a method by means of which various operating modes can be implemented in a simple manner.

In accordance with one exemplary embodiment of the invention, a transceiver circuit comprises at least one transmission path with a local oscillator input, which is coupled to a frequency conversion device of the at least one transmission path. Furthermore, the transceiver device is provided with a first and also at least one second reception path with in each case a local oscillator input, which is in each case coupled to a frequency conversion device of the respective reception path. The transceiver circuit thus contains one or a plurality of transmission paths and also a plurality of reception paths which in each case comprise signal mixers.

A first, second and third local oscillator circuit are furthermore provided, which are in each case designed for outputting a frequency-tunable signal. The transceiver circuit contains a programmable frequency divider circuit with at least three inputs and at least three outputs. A respective input is coupled to a respective one of the at least three local oscillator circuits for the purpose of feeding the signal thereto. At least one first output of the frequency divider circuit is coupled to the local oscillator input of the at least one transmission path. A second output of the frequency divider circuit is coupled to the local oscillator input of the first reception path, and at least one third output is coupled to the local oscillator input of the at least one second reception path. According to the invention, the frequency divider circuit is designed for division of a frequency of an input signal with an adjustable divider ratio and for outputting a frequency-divided signal. In this case, the input signal is present at at least one of the at least three inputs. The frequency-divided signal is provided at at least one of the at least three outputs.

The proposed frequency divider circuit of the transceiver circuit according to the invention enables a flexible distribution and configuration of local oscillator signals to the respective local oscillator inputs of the transmission and reception paths of the transceiver circuit. Depending on specifications or requirements, a local oscillator signal with a desired frequency, which signal is derived from the output signal of a local oscillator circuit, can thus be fed to a local oscillator input. Different mobile radio standards with different transmission and reception frequencies and also a wide variety of operating modes of the transceiver circuit are now possible after the provision of the local oscillator circuit and the frequency divider circuit connected thereto. Through correspondingly suitable specification of the output frequency ranges of voltage-controlled oscillators in the local oscillator circuits, a large frequency range is covered and a sufficient flexibility is nevertheless achieved with the individual settings.

In another exemplary embodiment, the programmable frequency divider circuit comprises a switching matrix.

The latter contains a multiplicity of possible switching states, in which case, in at least one of these switching states, a respective input of the frequency divider circuit is coupled to a respective output of the frequency divider circuit. Said at least one switching state can be set by means of a control signal at a switching input of the frequency divider circuit. The switching matrix of the programmable frequency divider circuit preferably comprises at least six different switching states. A respective input is coupled to a respective output of the frequency divider circuit in each of these switching states.

Consequently, in this embodiment, each input of the frequency divider circuit can be coupled to an output of the frequency divider circuit. The programmable frequency divider circuit thus enables a highly flexible assignment of the different signals present at its inputs to the local oscillator inputs of the transmission paths and reception paths of the transceiver circuit.

In another embodiment of the invention, the programmable frequency divider circuit comprises at least three frequency dividers with in each case an adjustable divider ratio. The frequency dividers are connected to an input of the programmable frequency divider circuit by an input and to an output of the frequency divider circuit by an output. In this case, the divider ratio of the at least three frequency divider circuits can preferably be set independently of one another. In one exemplary embodiment, the frequency dividers are designed as multi-modulus dividers. The divider ratio of the latter can be set by means of a setting signal. Other embodiments of a frequency divider with an adjustable divider ratio are likewise possible, however.

The programmable frequency divider circuit is, in one example, designed as an integrated circuit in a semiconductor body. This significantly reduces the space taken up by the programmable frequency divider circuit. In one embodiment of the invention, the programmable frequency divider circuit may, moreover, be formed in a semiconductor body which additionally contains the first, second and third local oscillator circuit and also parts of the transmission and reception paths of the transceiver circuit.

In another embodiment of the invention, the frequency conversion device of the transmission path comprises a vector modulator with a first input and a second input, an output and also a local oscillator input. This vector modulator is designed in one example as an I/Q modulator. In one embodiment of the invention, the local oscillator input of the vector modulator is coupled to a frequency divider with an adjustable divider ratio for division of frequencies of signals present at the local oscillator input. This further increases the flexibility in provision and feeding of the local oscillator signals.

In another embodiment, the frequency conversion devices of the first and the second receiver path are configured as a vector demodulator, and particularly advantageously as an I/Q demodulator. These may also comprise an additional frequency divider with an adjustable divider ratio for division of frequencies of signals present at the local oscillator input. Any combination of different local oscillator frequencies can thus be set by means of the frequency divider circuit and the frequency dividers with an adjustable divider ratio that are coupled to the local oscillator inputs of the vector modulators or vector demodulators.

It is advantageous in one example if at least two of the three local oscillator circuits comprise a different frequency tuning range. As a result, the entire frequency range from a few hundred MHz to 5.6 GHz can be covered with different local oscillator circuits. Depending on the requirement, by means of the frequency divider circuit in the transceiver circuit according to the invention, the local oscillator signal required for the requirement is generated from the signals of the local oscillator circuits and fed to the local oscillator input of the transmission path or of the reception paths.

The transceiver circuit can thus be used for a wide variety of operating modes without the need to provide particular circuits that are in each case optimized for the operating mode. In this case, the transceiver circuit is preferably designed for the use of a time slot method or a TDD operating mode. Further operating modes are a frequency slot method, an operating mode for the concurrent reception of a plurality of signals on different channels, a diversity operating mode or an operating mode of heterodyne reception.

In accordance with the present invention, a signal conditioning method according to the invention comprises providing a transceiver circuit and providing a first, second and third local oscillator circuit. An operating mode is then selected for the transceiver circuit, wherein the operating mode requires local oscillator signals with specific parameters. The local oscillator signals for this selected operating mode are generated and fed for the purpose of operating the transceiver circuit in the selected operating mode.

The number of local oscillator circuits required for the selected operating mode is preferably determined in this case. Furthermore, the required frequencies of the local oscillator signals are determined and the divider ratios for frequency division are set. Output signals of the local oscillator circuits are divided in terms of their frequency and processed further for the purpose of generating the required local oscillator signals. The division of these frequencies and also the generation of the required local oscillator signals are effected by a frequency divider circuit that feeds the generated local oscillator signals to the transceiver circuit. In this case, the generated local oscillator signals are expediently fed to the transmission path and/or to the reception paths which are required for the selected operating mode of the transceiver circuit.

In the case of the method according to the invention, then, a plurality of output signals of local oscillator circuits are processed and the conditioned signals are fed to the transceiver circuit for the purpose of operating the transceiver circuit in a selected operating mode. In this case, depending on the operating mode, different local oscillator circuits are used and their frequencies are divided with different divider ratios. The method according to the invention thus permits an extremely flexible and dynamic provision of local oscillator signals for transmission and reception paths of a transceiver circuit.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention is explained in detail below on the basis of exemplary embodiments with reference to the drawings. The exemplary embodiments illustrated offer only a schematic overview. In particular, the invention is not restricted to the enumerated operating modes and transmission or reception paths illustrated.

In the figures:

FIG. 3 is a block diagram of a frequency divider circuit in the transceiver circuit in accordance with FIG. 2, and FIG. 4 is a flow chart diagram illustrating a method according to yet another embodiment of the invention.

DETAILED DESCRIPTION OF THE INVENTION

The requirements made of transceivers for wire-free communication systems are rising very rapidly. Besides different mobile radio standards with frequencies lying in the range of 800 MHz to 5.4 GHz, the transceivers additionally have to be equipped for different operating modes. The latter may arise from the mobile radio standard, inter alia. By way of example, a time slot method is provided for the GSM mobile radio standard. In this case, the transceiver transmits and receives signals at different times. The length of the time slots is fixedly predetermined in the case of the GSM mobile radio standard, whereas the time slots may be of different lengths in the case of the 802.11a standard, by way of example, on account of a different volume of data.

In contrast to the above operating modes, transmission and reception are effected continuously in the case of the mobile radio standard WCDMA. Transmission and reception frequencies are in the region of 2 GHz and are separated by approximately 40 MHz. For the reception of UMTS signals, moreover, two active receiver stages are very often used in order to compensate for interference. A plurality of antennas situated next to one another are also used in some instances. Narrowband mobile radio standards such as IS136 require heterodyne receivers.

There is additionally a need to equip the transceiver for simultaneous or concurrent reception of a plurality of signals at different frequencies. By way of example, large volumes of data can be transmitted with the mobile radio standard WLAN, while at the same time a user uses the mobile radio standard GSM for voice transmission. In another example, a GPS signal for position determination is received, while data is simultaneously or concurrently transmitted or received.

In order to meet the various requirements made of signal generation, and in particular local oscillator signal generation, the present invention couples a plurality of local oscillators to a universal frequency divider circuit and uses the output signals as local oscillator signals for the transmission and reception paths of the transceiver. A block diagram of a transceiver designed according to one embodiment of the present invention is shown in FIG. 1.

Figure 1:
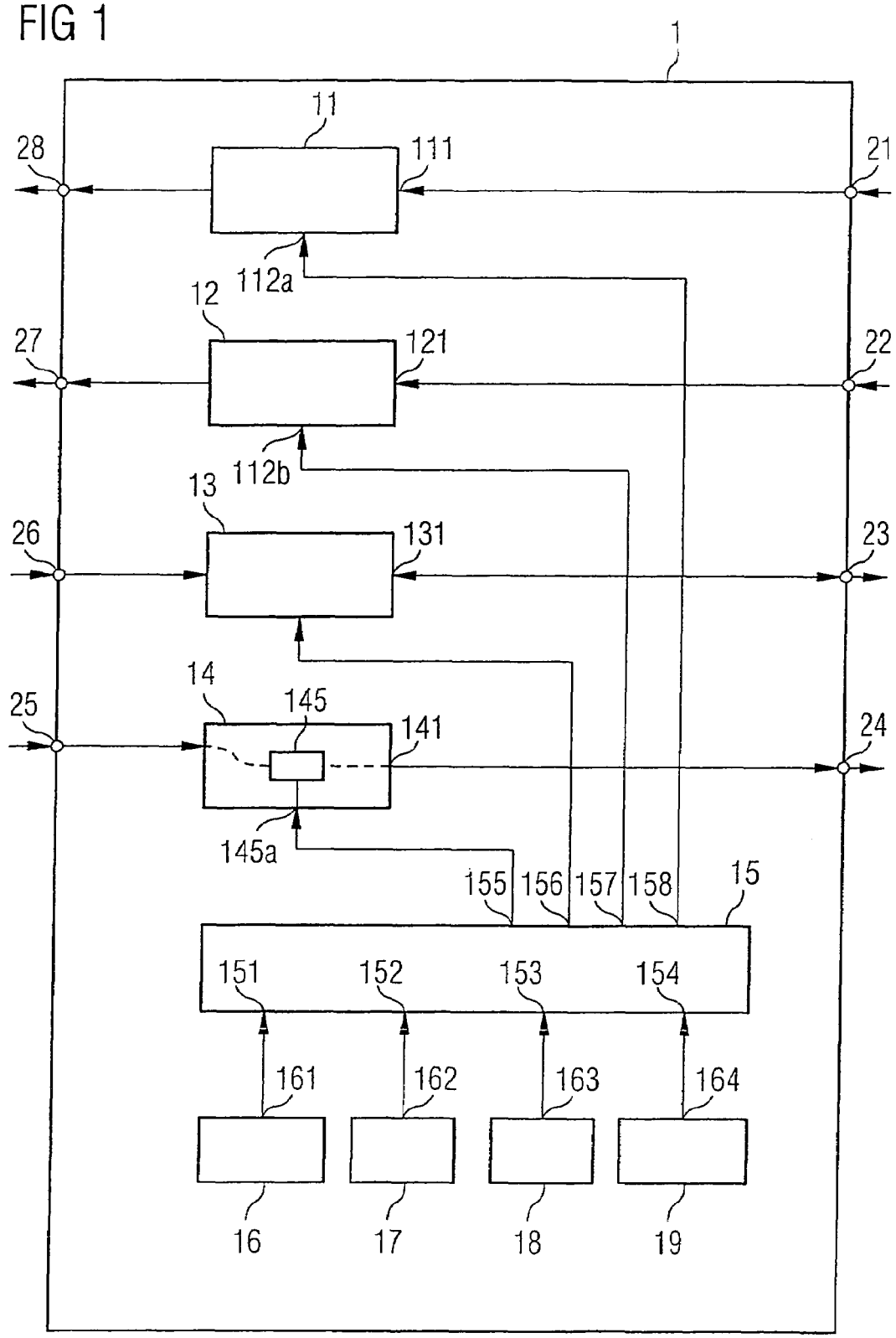
FIG. 1 is a block diagram illustrating a transceiver circuit according to one embodiment of the invention.

FIG. 1 illustrates a transceiver circuit 1, which comprises two inputs 21 and 22 for a received signal. Furthermore, it contains two signal outputs 23 and 24, which are in this case coupled to an antenna (not illustrated). The transceiver circuit 1 may be part of a mobile communication device, for example of a mobile radio (phone), notebook or PDA. Furthermore, the transceiver circuit 1 comprises two digital signal outputs 27 and 28, which lead to further assemblies of the mobile communication device, said assemblies not being illustrated for reasons of clarity. These process further the data output by the transceiver circuit at the digital signal outputs. Besides hardware assemblies, software-based signal processing is also conceivable in this case.

The transceiver circuit contains two further digital signal inputs 25 and 26, which are connected to respective inputs of a transmission path 14 and 13. The transmission path 14 and also the transmission path 13 are designed for conversion of the digital signals present at the inputs 25 and 26, respectively, into analog signals and for conversion to the transmission frequency. The signals converted to the transmission frequency are output at the outputs 131 and 141, respectively. The output 131 of the transmission path 13 is connected to the signal output 23, and the output 141 of the transmission path 14 is connected to the output 24.

The signal input 21 of the transceiver circuit 1, at which a received signal is present, is connected to an input 111 of a first reception path 11. The second signal input 22 is coupled to a signal input 121 of a second reception path 12. The first reception path 11 and the second reception path 12 are in each case designed for conversion of signals present at the inputs 111 and 121, respectively, to an intermediate frequency. The signal converted to the intermediate frequency is converted into a digital signal and output to the outputs 27 and 28, respectively, of the transceiver circuit 1.

For frequency conversion, the reception paths 11 and 12 and the transmission paths 13 and 14 in each case require a local oscillator signal. In this case, the frequency of the local oscillator signal is dependent on the mobile radio standard used for the signal to be transmitted and the received signal. It is consequently possible for local oscillator signals having different frequencies in each case to be present at the respective local oscillator inputs of the transmission and reception paths. In this case, the frequency range of received signals and also the frequency range of the signals to be transmitted extends over a range of up to a few GHz.

In addition, the requirements made of the signal quality of the local oscillator signals may be different depending on the mobile radio standard. Thus, by way of example, the requirements made of the local oscillator signal in the case of reception of a GPS signal are significantly less stringent than the requirements made of the local oscillator signal for the reception of a UMTS signal.

In order to meet the various requirements and at the same time to produce a sufficient quality of the local oscillator signals, the transceiver circuit according to the invention comprises four phase locked loops 16, 17, 18 and 19. Each of said phase locked loops contains a voltage-controlled oscillator with a tuning range which, at the outputs of the respective phase locked loops, outputs a signal that can be tuned over a frequency range. The signal outputs 161 to 164 of the phase locked loops 16 to 19 are connected to the inputs 151, 152, 153 and 154, respectively, of a frequency divider circuit 15. This frequency divider circuit contains a plurality of frequency dividers with an adjustable divider ratio, which divide the signals present on the input side in the divider ratio. The divider ratio of the frequency dividers of the divider circuit 15 can be set independently of one another. As a result, it is possible to generate local oscillator signals with different frequencies. The local oscillator signals thus generated are fed to a switching matrix, which distributes them between the outputs 155, 156, 157 and 158.

In this case, the output 155 is connected to the local oscillator input 145a of the transmission path 14, and the output 156 is connected to the local oscillator input 145b of the transmission path 13. The outputs 157 and 158 are connected to the local oscillator inputs 112a and 112b of the reception paths 12 and 11, respectively.

Depending on the desired operating requirement or selected mobile radio standard in the case of the transmission path and in the case of the reception paths, the output signals of the phase locked loops 16 to 19 can thus be divided in terms of their frequency with adjustable frequency divider ratios and be assigned selectively to the local oscillator inputs of the transmission and reception paths.

Figure 2:
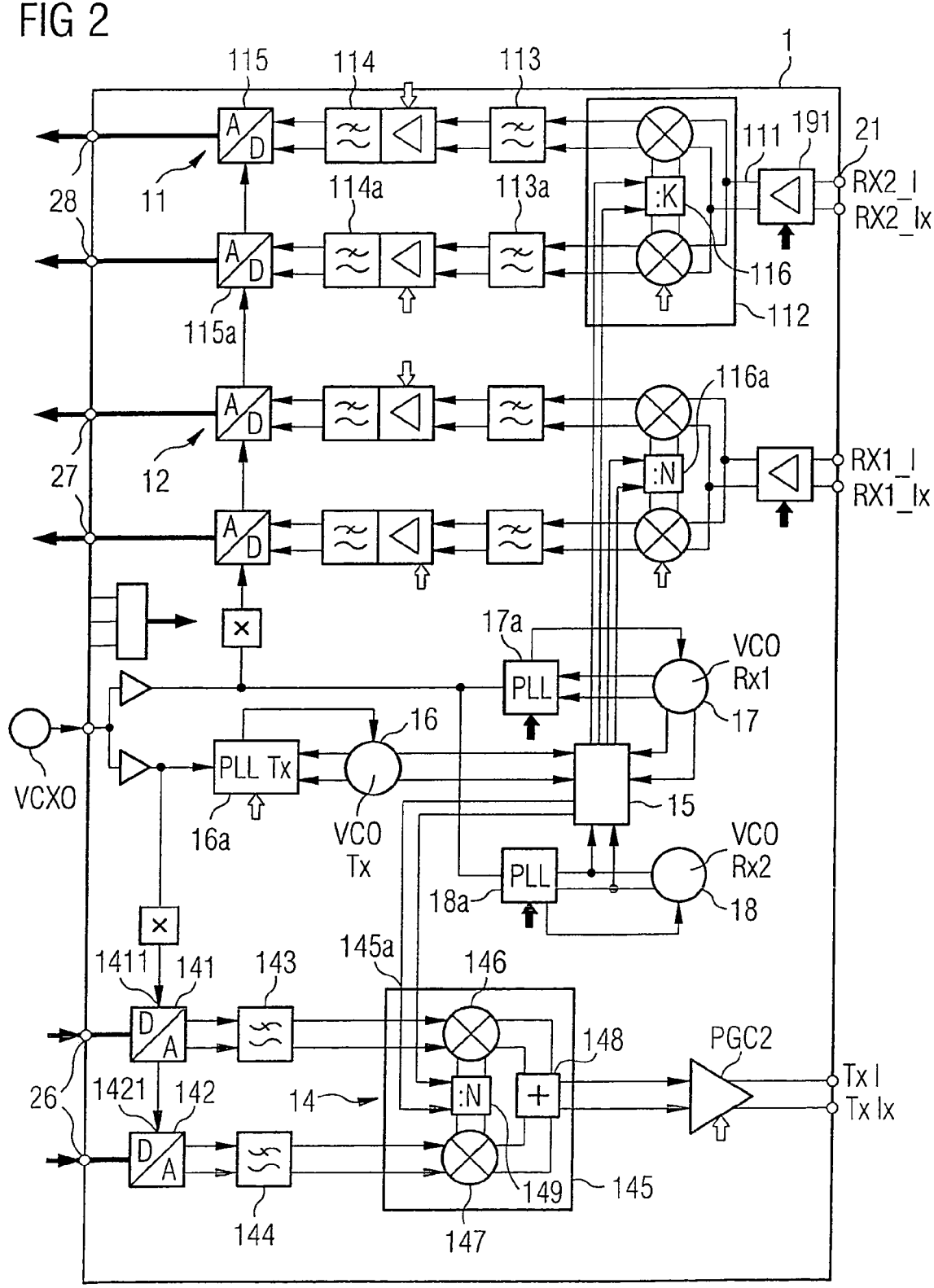
FIG. 2 is a block diagram of a transceiver circuit according to another embodiment of the invention.

A further exemplary embodiment of a transceiver circuit is shown in FIG. 2. The transceiver circuit 1 in this case contains one transmission path and two reception paths. Components corresponding to FIG. 1 bear identical reference symbols. The transceiver circuit according to the embodiment of FIG. 2 is designed for push-pull signal processing. Push-pull signal processing is advantageous particularly in the signal processing of high frequencies on account of the lower sensitivity to coupled-in interference signals.

The transmission path 14 of the transceiver circuit 1 comprises two digital/analog converters 141 and 142. The latter are in each case connected to an input terminal of the input 26. The digital/analog converters 141 and 142 convert a digital signal present at the inputs 26 into an analog differential signal. For this purpose, they are clocked with a clock signal of an oscillator VCXO. Said clock signal is in each case applied to their clock signal input 1411 and 1421, respectively. The outputs of the digital/analog converters 141 and 142 are connected to the inputs of a vector modulator 145 via a low-pass filter 143 and 144, respectively. The vector modulator is also referred to as I/Q modulator. Incidentally, a corresponding polar modulator may also be used instead of a vector modulator.

The vector modulator 145 contains a first mixer 146, which is designed for conversion of a differential signal to an output signal with the aid of a local oscillator signal. The signal input of the mixer 146 for the differential signal is connected to the signal output of the low-pass filter 143. The second mixer 147, which is likewise designed for conversion of a differential signal present on the input side to an output signal with a local oscillator signal, is connected by its input to the signal output of the second low-pass filter 144. The signal outputs of the mixers 146 and 147 are connected to a summation unit 148, the output of which forms the output of the vector modulator 145. The output of the vector modulator is connected to the signal output 24 via an amplifying device PGC2. The signal TXI to be transmitted and the associated differential signal TXIX can be tapped off at the two taps of the signal output 24.

The two local oscillator signals that are fed to the local oscillator inputs of the mixers 146 and 147 are phase-shifted by 90 degrees with respect to one another.

Moreover, the local oscillator inputs are connected to the local oscillator input of the vector modulator 145 via a frequency divider circuit 149 with an adjustable divider ratio N. The frequency divider circuit 149 divides the frequency of a signal present at the local oscillator input by the factor N and generates the two mutually orthogonal local oscillator partial signals. The two partial local oscillator signals are in each case fed to the local oscillator input of the mixers 146 and 147, respectively. This operation is also referred to as I/Q modulation.

The signal input 21 of the transceiver circuit 1 comprises a first and a second tap for a received signal RX2I and the associated differential signal RX2IX. The input 21 is connected to a low noise amplifier 191, the output of which is connected to the input 111. The input 111 simultaneously forms the input of a vector demodulator 112. The vector demodulator, which is also referred to as I/Q demodulator, contains a first and also a second mixer with in each case a signal input for a differential signal and also a local oscillator input and a differential signal output. The outputs of the two mixers form the outputs of the vector modulator 112.

A low-pass filter 113 and 113a is respectively connected to the outputs, the signal output of said low-pass filter being connected to a gain-adjustable low noise amplifier with a low pass filter connected downstream. The filtered and amplified signal is fed to an analog-to-digital converter 115 and 115a, respectively. The latter converts the respective differential signal into a digital signal and outputs it at one of the two output taps of the output 28.

The mixers of the vector demodulator 112 are connected by their respective local oscillator inputs to a frequency divider circuit 116 with an adjustable divider ratio K. The divider circuit 116 divides a signal present at the local oscillator input of the vector demodulator 112 with the divider factor K and feeds two local oscillator signals to the mixers of the demodulator 112. In this case, the partial signals have a phase offset of 90 degrees with respect to one another and are thus orthogonal to one another. The second reception path is constructed in the same way.

The vector demodulator thus converts a signal present on the input side to an intermediate frequency with the aid of a local oscillator signal present at the local oscillator input and generates a complex-value output signal with a first and a second component. In this case, the first component is referred to as an inphase component I and the second component is referred to as a quadrature component Q. These components are processed further in the downstream partial paths and output to a respective output tap of the output 28. The further digital processing is effected in components (not illustrated further here) which demodulate the complex-value digital signal.

The second reception path 12 is constructed in the same way. It also comprises a vector demodulator which is designed as an I/Q demodulator and has a frequency divider circuit. The latter is likewise designed with an adjustable divider ratio.

Local oscillator signals are required for operation of the vector modulator of the transmission path and the vector demodulator of the two reception paths. The frequency of the local oscillator signals differs depending on requirements and selected operating mode. For this purpose, the transceiver circuit according to the invention comprises a universal frequency divider circuit 15 having a total of three signal inputs. Each of these three signal inputs is connected to a voltage-controlled oscillator. The oscillators 16, 17 and 18 have a respectively different tuning range in this case.

For tuning, they are in each case connected to a phase locked loop 16a, 17a and 18a, respectively. These phase locked loops in each case comprise a reference signal input coupled to the reference signal of a further voltage-controlled oscillator VCXO. The tuning of the output signal of the oscillators 16, 17, 18 to a specific output frequency is carried out by means of the phase locked loops 16a, 17a and 18a, respectively. Thus, the tuning range of the oscillator 16 is in the range of 3 to 5 GHz, the tuning range of the oscillator 18 is likewise in the range of 3 to 5 GHZ, and the tuning range of the oscillator 17 is in the range of between 11 and 13 GHz. These frequency ranges make it possible to integrate the oscillators and, if appropriate, the associated phase locked loops on an individual chip and to operate them simultaneously without causing interference phenomena between the circuits and especially between the oscillators. Operation without mutual interference is thereby possible.

If local oscillator signals outside this range are required, then they are obtained by frequency division.

For this purpose, the output signals of the oscillators 16, 17 and 18 are fed to the universally programmable frequency divider circuit 15. The latter has a plurality of frequency dividers with an adjustable divider ratio and also a switching matrix. By means of the switching matrix, each of the inputs of the frequency divider circuit 15 can be connected to an output of the frequency divider circuit. At the same time, a signal applied on the input side can be divided by one of the frequency dividers within the frequency divider circuit 15 with an adjustable frequency divider ratio.

Consequently, any arbitrary frequency can be achieved by means of the frequency divider circuit and the tuning ranges of the oscillators 16, 17 and 18. By virtue of the respectively relatively narrow tuning range of the oscillators 16, 17 and 18, the quality and the quality factor of the local oscillator signals are sufficient even for very stringent requirements. In addition, the frequency divider circuit can also connect an input signal to a plurality of outputs.

The table below shows an overview of various operating modes and the oscillators used in these operating modes.

| Operating mode | VCO 17 (Rx1) | VCO 18 (Rx2) | VCO 16 (Tx) |
|---|---|---|---|
| TDD | (Tx) | | X |
| FDD | X | | X |
| Multiple reception | X | X | X |
| Channel monitoring | X | X | X |
| Diversity | X | (Rx1) | X |
| Cartesian loop | | (Tx) | X |
| Heterodyne reception | X | X | X |

TDD and FDD denote the time slot method as in the case of GSM and, respectively, the frequency slot method that is performed for WCDMA, by way of example. For this reason, in the case of a TDD operating mode, the local oscillator circuit can be used for the transmission path and the reception path. In the case of multiple reception, data are received on both reception channels at different frequencies. Channel monitoring enables for example a continuous data transmission at one frequency, while signals at a second frequency are simultaneously monitored. Diversity is distribution between a plurality of antennas, both for reception and for transmission operation. Heterodyne reception is used for highly broadband signals, and also for narrowband systems. The Cartesian loop operating mode is used for compensation of the DC signal component and thus for residual carrier suppression in the output signal. In this case, a part of the output signal is fed back in one of the receiver parts, converted to baseband and fed to the transmission path again in a suitable manner. The local oscillator of the transmission path may be used in this case.

Preferably, the frequency divider circuits 149, 116, 116a both of the vector modulators and vector demodulators and also of the programmable frequency divider circuit are as far as possible of universal design. The divider ratios are in this case integers between 1 and 16. The required tuning range of the individual oscillator circuits which is lower by virtue of the high degree of variation of the adjustable divider ratios additionally reduces mutual influencing and disturbance due to interference. The local oscillators can thus be formed on one and the same semiconductor module. In addition, the phase noise is improved and the current consumption can be lowered. If identical divider ratios are required for the local oscillator signals of the reception and transmission paths, it is possible to use a common divider within the frequency divider circuit. This simplifies operational control and lowers the current consumption. Depending on the application and requirement, it is thus possible to form all common divider ratios in frequency dividers within the frequency divider circuit 15, while the additional divider ratios are formed in the frequency divider circuits of the vector modulator or of the vector demodulators.

FIG. 3 shows an exemplary embodiment of a programmable frequency divider circuit 15 according to the invention such as is used in the transceiver circuit in accordance with FIG. 2. The frequency divider circuit contains three signal inputs 151 to 153 each having two input terminals for the differential input signal. In addition, the programmable frequency divider circuit 15 has three signal outputs each having two terminals for a differential signal. The frequency divider circuit 15 contains three frequency dividers 451, 452 and 453. Each of said frequency dividers is designed with an adjustable divider ratio as a multi-modulus divider.

A multi-modulus divider divides a signal present on the input side in a frequency divider ratio which is predetermined by a digital signal at a setting input. For this purpose, each of the three frequency dividers has a setting input connected to a setting input 551 to 553 of the frequency divider circuit 15. Thus the setting input of the frequency divider 451 is connected to the setting input 551, the setting input of the frequency divider 452 is connected to the setting input 552 and the setting input of the frequency divider 453 is connected to the setting input 553 of the frequency divider circuit 15. The outputs of the frequency dividers 451 to 453 leads to a switching matrix 500. This switching matrix switches the inputs to one or a plurality of outputs depending on a signal at a switching input 554 of the frequency divider circuit 15.

In the present exemplary embodiment, by means of the switching matrix 500, the output of the frequency divider 451 is connected to the output 155 of the frequency divider circuit and the output of the frequency divider 453 is connected to the outputs 156 and 157, respectively, of the frequency divider circuit 15. A signal with a frequency which results from the frequency of a signal at the input 153 divided by the factor F3 is thus present at the outputs 156 and 157, respectively, of the frequency divider circuit 15. The frequency of the output signal at the output 155 results from a signal present at the input 151 and the divider factor F1. The switching matrix 500 thus enables a flexible assignment of the respective oscillator signals present at the inputs 151 to 153 to the outputs 155 to 157 which are connected to the local oscillator inputs of the vector demodulator and the vector demodulators.

In this exemplary embodiment, the frequency dividers are connected upstream of the switching matrix 500 of the frequency divider circuit 15. However, it is also possible in the same way to reverse the signal flow and to connect the switching matrix 500 upstream of the frequency dividers.

FIG. 4 shows a flow chart diagram for a setting in accordance with a desired operating mode in the transceiver circuit according to the invention. After providing the transceiver circuit at step 1, which is designed with at least one transmission and one reception path and comprises a plurality of operating modes, a number of oscillators are provided in step 2. An operating mode of the transceiver circuit is then selected in step 3. This may be for example a specific mobile radio standard that is used for transmission and also for reception of signals.

In addition, it is possible to select a further mobile radio standard for a further reception of a signal. By way of example, a voice transmission may be effected in accordance with the UMTS mobile radio standard, while at the same time the transceiver receives a GPS signal for position determination in a reception path. In another example, the two reception paths are used for a diversity operating mode during the reception of a UMTS signal. This enables compensation of crosstalk signals and interference and thus a better reception.

The selection of the operating mode of the transceiver in step 3 reveals which of the available oscillators are required at step 4. The various divider ratios both in the frequency divider circuit 15 and in the vector demodulators and vector modulators are then set in step 5. In addition, the output signal of the required oscillators is tuned to the desired frequency. In this case, the tuning results from the required local oscillator signals for the selected operating mode, the set frequency divider ratios of the frequency divider circuit 15 and of the modulators and also the transmission and the reception frequency. After the correct divider ratios have been set, the switching matrix of the frequency divider circuit 15 is switched in such a way that the frequency-divided output signals of the required oscillators are now connected to the respective outputs of the frequency divider circuit and are thus fed to the local oscillator inputs of the required transmission and reception paths in step 6. In step 7, the transceiver arrangement is thus operated in the desired operating mode. If the operating mode is altered as in step 8, then it may be necessary, in accordance with step 4, to effect a renewed selection of oscillators, frequency divider ratios and a switch setting.

In this exemplary configuration, a design in a complementary MOS process is appropriate since a good isolation of more than 90 db is ensured between the various signals of the oscillator circuit in the frequency divider circuit. The dynamic assignment and the large tuning range for local oscillator signals which is possible by virtue of the frequency divider circuit make it possible to introduce further operating modes and mobile radio standards by simply changing the settings. This concept is thus significantly more flexible and more futureproof than conventional concepts with a large tuning range of a local oscillator but only a small selection of frequency divider ratios.

The entire transceiver circuit, but in particular the frequency divider circuit according to the invention and the oscillators can be implemented in a single semiconductor module. Moreover, crosstalk or interference between the individual oscillator signals is only very low by virtue of the skillful selection of the tuning ranges between 3 and 5 or 11 and 13 gigahertz. Complex shielding measures can thereby be reduced. This concept can be extended to as many transmission and reception paths as desired, so that it can also be used, in particular, for base stations.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A transceiver circuit, comprising:
at least one transmission path having a local oscillator input coupled to a frequency conversion device of the transmission path;
a first reception path having a local oscillator input coupled to a frequency conversion device of the first reception path;
at least one second reception path having a second local oscillator input coupled to a frequency conversion device of the second reception path;
at least one first, second and third local oscillator circuit configured to generate and output a respective frequency-tunable output signal;
a programmable frequency divider circuit having at least three inputs and at least three outputs, wherein a respective input is coupled to a respective output signal of the at least first, second and third local oscillator circuits, and further comprising a first output coupled to the local oscillator input of the at least one transmission path, a second output coupled to the local oscillator input of the first reception path, and at least one third output coupled to the local oscillator input of the at least one second reception path, and
wherein the frequency divider circuit is configured to divide a frequency of the respective output signal present at least one of the inputs with an adjustable divider ratio and output a frequency-divided signal at least one of the at least three outputs.

2. The transceiver circuit of claim 1, wherein
the programmable frequency divider circuit comprises a switching matrix comprising a multiplicity of switching states, wherein in at least one of the switching states, a respective input of the frequency divider circuit is coupled to a respective output of the frequency divider circuit, and the at least one switching state is set by means of a control signal at a switching input of the frequency divider circuit.

3. The transceiver circuit of claim 2, wherein
the switching matrix of the programmable frequency divider circuit comprises at least six different switching states, wherein a respective input is coupled to a respective output in each of these switching states.

4. The transceiver circuit of claim 1, wherein
the programmable frequency divider circuit comprises at least three frequency dividers each comprising an adjustable divider ratio, wherein the at least three frequency dividers are coupled such that they are connected to an input of the programmable frequency divider circuit by an input, and to an output of the frequency divider circuit by an output.

5. The transceiver circuit of claim 4, wherein
the frequency dividers of the frequency divider circuit comprise multi-modulus dividers.

6. The transceiver circuit of claim 4, wherein
the frequency divider circuit comprises a setting input configured to feed in a digital signal for the at least three frequency dividers.

7. The transceiver circuit of claim 1, wherein
the frequency conversion device of the transmission path comprises a vector modulator with a first input for receipt of a first signal component, a second input for receipt of a second signal component, an output, and a local oscillator input, wherein the vector modulator is configured to convert the first signal component and the second signal component with a signal at the local oscillator input to an output signal.

8. The transceiver circuit of claim 7, wherein
the local oscillator input of the vector modulator is coupled to a frequency divider with an adjustable divider ratio for division of a frequency of a signal present at the local oscillator input.

9. The transceiver circuit of claim 1, wherein
the frequency conversion devices of the first and of the second receiver path in each case comprise a vector demodulator comprising an input, a first output for provision of a first output signal component, and a second output for provision of a second output signal component, and a local oscillator input, wherein the vector demodulators are configured to decompose an input signal with a local oscillator signal into the first and the second output signal components, respectively.

10. The transceiver circuit of claim 9, wherein
the local oscillator input of at least one vector demodulator is coupled to a frequency divider comprising an adjustable divider ratio for division of a frequency of a signal present at the local oscillator input.

11. The transceiver circuit of claim 1, wherein
at least two of the three local oscillator circuits comprise a non-overlapping frequency tuning range.

12. The transceiver circuit of claim 1, wherein
the local oscillator circuits comprise a portion of a respective phase locked loop.

13. The transceiver circuit of claim 1, wherein
one of the at least one first, second and third local oscillator circuit has a tuning range of 11 GHz to 13 GHz, and two of the at least one first, second and third local oscillator circuit have a tuning range of 3 GHz to 5 GHz.

14. A transceiver, comprising:
a frequency converter in each of a transmission path and a reception path, wherein the frequency converter in the transmission path is configured to convert a signal from a baseband frequency up to a transmission frequency, and the frequency converter in the reception path is configured to convert a signal from a reception frequency down to an intermediate frequency;
a plurality of tunable oscillator circuits, wherein each of the plurality of tunable oscillator circuits is configured to generate an oscillator signal at a plurality of differing frequencies; and
a frequency divider circuit configured to receive the oscillator signals from the plurality of tunable oscillator circuits and divide down one or more of the oscillator signals by a tunable divider ratio, respectively, and output a plurality of divided down oscillator signals as local oscillator signals to the frequency converters in the transmission path and reception path, respectively
wherein the frequency divider circuit comprises:
a plurality of division components, each having a tunable division ratio associated therewith, and configured to receive the oscillator signals and output divided down oscillator signals based on the respective division ratios; and
a switching matrix having inputs coupled to outputs of the division components, and configured to selectively couple the divided down oscillator signals to outputs thereof based on a selected mode of operation of the transceiver.

15. The transceiver of claim 14, wherein the frequency divider circuit is configured to divide down the one or more oscillator signals a predetermined amount based on a selected mode of operation of the transceiver.

16. The transceiver of claim 14, wherein the tunable division ratios of the plurality of division ratios are a function of the selected mode of operation of the transceiver.

17. A transceiver, comprising:
a frequency converter in each of a transmission path and a reception path, wherein the frequency converter in the transmission path is configured to convert a signal from a baseband frequency up to a transmission frequency, and the frequency converter in the reception path is configured to convert a signal from a reception frequency down to an intermediate frequency;
a plurality of tunable oscillator circuits, wherein each of the plurality of tunable oscillator circuits is configured to generate an oscillator signal at a plurality of differing frequencies; and
a frequency divider circuit configured to receive a plurality of oscillator signals from the plurality of tunable oscillator circuits and divide down one or more of the oscillator signals from the plurality of oscillator signals by a tunable divider ratio, respectively, and further configured to selectively output based on a control signal different combinations of one or more divided down oscillator signals as local oscillator signals to the frequency converters in the transmission path and reception path, respectively.

18. The transceiver of claim 17, wherein the frequency divider circuit comprises:
a plurality of division components, each having a tunable division ratio associated therewith, and configured to receive the oscillator signals and output divided down oscillator signals based on the respective division ratios; and
a switching matrix having inputs coupled to outputs of the division components, and configured to selectively couple the divided down oscillator signals to outputs thereof based on a selected mode of operation of the transceiver.

* * * * *